US009791268B2

(12) United States Patent
Buzzi et al.

(10) Patent No.: US 9,791,268 B2
(45) Date of Patent: Oct. 17, 2017

(54) DEVICE AND METHOD FOR MEASURING THE CHARACTERISTIC ANGLES AND DIMENSIONS OF WHEELS, STEERING SYSTEM AND CHASSIS OF VEHICLES IN GENERAL

(75) Inventors: Carlo Buzzi, Mandello del Lario (IT); Giancarlo Torri, Mandello del Lario (IT)

(73) Assignee: CEMB S.P.A., Mandello del Lario (IT)

(*) Notice: Subject to any disclaimer, the term of this patent is extended or adjusted under 35 U.S.C. 154(b) by 474 days.

(21) Appl. No.: 14/346,199

(22) PCT Filed: May 22, 2012

(86) PCT No.: PCT/EP2012/059446
§ 371 (c)(1),
(2), (4) Date: Mar. 20, 2014

(87) PCT Pub. No.: WO2013/041252
PCT Pub. Date: Mar. 28, 2013

(65) Prior Publication Data
US 2014/0219509 A1    Aug. 7, 2014

(30) Foreign Application Priority Data

Sep. 21, 2011 (IT) ................ MI2011A1695

(51) Int. Cl.
*G01B 11/26* (2006.01)
*G01B 11/275* (2006.01)

(52) U.S. Cl.
CPC .......... *G01B 11/26* (2013.01); *G01B 11/2755* (2013.01); *G01B 2210/12* (2013.01); *G01B 2210/143* (2013.01); *G01B 2210/146* (2013.01)

(58) Field of Classification Search
CPC ........ G01B 2210/303; G01B 2210/146; G01B 2210/10; G01B 2210/14; G01B 11/2755; G01B 11/275
See application file for complete search history.

(56) References Cited

U.S. PATENT DOCUMENTS 5,148,591 A    9/1992  Pryor
5,724,129 A    3/1998  Matteucci
(Continued)

FOREIGN PATENT DOCUMENTS

DE    4212426 C1    7/1993
EP    0803703 A1    10/1997
(Continued)

OTHER PUBLICATIONS

Nasse, H. H. "Depth of field and bokeh." Carl Zeiss Camera Lens Division Report (2010).*
(Continued)

*Primary Examiner* — Chan Park
*Assistant Examiner* — Geoffrey E Summers
(74) *Attorney, Agent, or Firm* — Cantor Colburn LLP

(57) ABSTRACT

A device for measuring the characteristic angles and dimensions of wheels, steering system and chassis of vehicles in general, comprising a plurality of three-dimensional optical readers which are functionally connected to a computer and can be arranged peripherally to a vehicle whose dimensions and characteristic angles of wheels, steering system and chassis are to be measured in such a manner that each one frames at least one wheel of the vehicle for the three-dimensional acquisition of an image of the wheel, each three-dimensional optical reader being provided with at least one fixed target for the setting and calibration of the measurement device, at least one camera of each three-dimensional optical reader being arranged in such a manner as to
(Continued)

frame clearly and directly at least one fixed target of another three-dimensional optical reader for the setting and calibration of the measurement device by three-dimensional acquisitions of the fixed targets.

15 Claims, 6 Drawing Sheets

(56) References Cited

U.S. PATENT DOCUMENTS

| | | | | |
|---|---|---|---|---|
| 6,424,411 | B1* | 7/2002 | Rapidel | G01B 11/002 |
| | | | | 33/203.18 |
| 6,690,456 | B2* | 2/2004 | Bux | G01B 11/275 |
| | | | | 33/203.18 |
| 6,968,282 | B1* | 11/2005 | Jackson | G01B 11/2755 |
| | | | | 33/203.18 |
| 7,336,350 | B2 | 2/2008 | Dorrance et al. | |
| 7,982,766 | B2 | 7/2011 | Corghi | |
| 8,127,599 | B2 | 3/2012 | Schommer et al. | |
| 2002/0080343 | A1 | 6/2002 | Bux et al. | |
| 2005/0068522 | A1* | 3/2005 | Dorrance | G01B 11/2755 |
| | | | | 356/139.09 |
| 2006/0152711 | A1* | 7/2006 | Dale | G01B 11/2755 |
| | | | | 356/139.09 |
| 2007/0124949 | A1* | 6/2007 | Burns, Jr. | G01B 11/2509 |
| | | | | 33/288 |
| 2007/0127949 | A1 | 6/2007 | Ueno | |
| 2010/0303336 | A1* | 12/2010 | Abraham et al. | |
| 2011/0085181 | A1* | 4/2011 | Muhle | G01B 11/25 |
| | | | | 356/615 |
| 2011/0187851 | A1 | 8/2011 | Nobis et al. | |
| 2012/0007957 | A1 | 1/2012 | Abraham et al. | |
| 2013/0271574 | A1 | 10/2013 | Dorrance et al. | |

FOREIGN PATENT DOCUMENTS

| | | |
|---|---|---|
| EP | 1717547 A1 | 11/2006 |
| FR | 2808082 | 10/2001 |
| WO | 2006074026 A1 | 7/2006 |
| WO | 2007077063 A1 | 7/2007 |

OTHER PUBLICATIONS

Sward, Jeffrey. "35mm Lens Coverage in Degrees (Field of View)." N.p., Sep. 27, 2010. Web. Jun. 22, 2016.*

Third Party Observation for corresponding application PCT/EP2012/059446 filed May 22, 2012; Submission Date Apr. 18, 2013.

International Search Report for corresponding application PCT/EP2012/059446 filed May 22, 2012; dated Jul. 25, 2012.

CN office action issued Dec. 2, 2015 re: Application No. 201280045840.9; pp. 1-17; citing: CN101124454A, US20070124949A1, US2002080343A1, US20100303336A1, EP0803703A1, DE4212426C1 and EP1717547A1.

* cited by examiner

DEVICE AND METHOD FOR MEASURING THE CHARACTERISTIC ANGLES AND DIMENSIONS OF WHEELS, STEERING SYSTEM AND CHASSIS OF VEHICLES IN GENERAL

The present invention relates to a device and a method for measuring the characteristic angles and dimensions of wheels, steering system and chassis of vehicles in general.

Currently, alignment devices are known which are generally used to measure the characteristic angles and dimensions of wheels, steering system and chassis of vehicles in order then to compare them with reference data so as to be able to adjust said characteristic angles.

The correct adjustment of these angles is essential in order to make the wheels work in an optimum manner and in full safety, reducing the fuel consumption of the vehicle and also reducing the wear of the tires applied to said wheels.

In recent years, with the development of contactless shape measurement devices it has been possible to perfect measurement devices capable of detecting the characteristic angles and dimensions cited above without touching the vehicle, but simply by arranging it within a measurement area delimited peripherally by two or more measurement devices.

More precisely, these measurement devices consist generally of three-dimensional optical readers commonly known as 3D scanners, arranged in a known position around the vehicle whose characteristic dimensions are to be measured.

Accurate knowledge of the position of these 3D scanners is crucial for the accuracy of the measurement of wheel alignment.

It is in fact easy to infer that the accuracy of measurement of the characteristics of the vehicle depends equally on the measurement accuracy of the scanners and on the accuracy of the knowledge of the relative position of said scanners with respect to each another.

Since the measurement accuracies of the characteristics of the vehicle required by the application are very high, on the order of hundredths of a degree for the angles and of tenths of millimeters for the dimensions, it is not possible in practice to ensure that the relative position of the 3D scanners is not subject to variations of these orders of magnitude, for example due to thermal reasons, stability of the foundations on which the 3D scanners are fixed, et cetera.

It is inevitable, therefore, to provide a simple and automatic system for measuring the relative position of the 3D scanners, without which the entire device becomes unusable.

In greater detail, in order to control and determine this position the background art provides these 3D scanners with setting systems, which consist generally of a plurality of targets, each associated with a 3D scanner, and a plurality of video cameras, each likewise associated with a 3D scanner and adapted to acquire clearly the targets arranged on the other 3D scanners.

In this manner, such conventional setting system allows to measure the relative position of the individual 3D scanners, which, together with the measurement of the position of each wheel of the vehicle with respect to said 3D scanners, allows to obtain, by combining the data, the characteristic angles and dimensions of the vehicle.

More precisely, the need to have video cameras in addition to the ones with which the 3D scanners are usually provided is due to the fact that until recently the resolution of the digital optical sensors used in the cameras was low.

In fact, in order to obtain a good three-dimensional acquisition of the wheel the image of the wheel must be received by a sufficiently large number of pixels of the sensors of the cameras.

Until recently, the resolution of digital optical sensors was so low as to require the image of the wheel to cover the entire area of the sensor in order to be received by a sufficient number of pixels.

Because of this, together with the fact that for good three-dimensional acquisition there is a minimum limit to the distance from the wheels at which the 3D scanners can be placed, usually 70 centimeters, it was necessary to size the vision system so as to frame the wheels frontally and with a low viewing angle, smaller than 60°. This is done by selecting lenses, for an equal sensor size, with a high focal length, greater than or equal to 5 millimeters. This entails, for an equal energy that strikes the sensor and for an equal resolution of the sensor, having a clear field, i.e., the space in which the objects are acquired with tolerable focus loss, that has a reduced depth, less than half a meter for a diameter of the tolerable circle of confusion of 2.2 micrometers.

This situation suffers drawbacks, including the fact that it is not possible to frame clearly objects arranged on other turrets, leading to the need for additional cameras for calibration among turrets, and that it is not possible to frame a plurality of wheels with the same camera, leading to the need to have many cameras in order to take into account the different vehicle dimensions or movement system.

Recently, the increase in the resolution of optical sensors has made it possible to obtain a good three-dimensional acquisition also with a wheel image which covers a limited part of the sensor area. It has become therefore possible to select lenses with a low focal length, shorter than 5 millimeters, which provide wide viewing angles, over 60°, and depths of field greater than half a meter for a diameter of the tolerable circle of confusion of 2.2 micrometers. As a consequence, it is possible to frame clearly objects arranged on the other turrets, with the consequent possibility to eliminate the additional cameras for calibration among the turrets, and to frame a plurality of wheels with the same camera, with the consequent possibility to reduce the number of turrets and avoid movement systems, at most a single turret per side.

These conventional measurement devices are not devoid of drawbacks, among which is the fact that the described setting systems complicate considerably the measurement devices, making their calibration more difficult as well as increasing their production costs.

This drawback constitutes therefore one of the main reasons for which measurement devices of this type have not yet been commercially successful, since they have not reached sufficient measurement robustness.

The aim of the present invention is to eliminate the drawbacks and overcome the limitations mentioned above, by providing a device for measuring the characteristic angles and dimensions of wheels, steering system and chassis of vehicles in general, and by perfecting a corresponding measurement method, which allow to measure accurately the characteristic values of the vehicle by means of contactless shape measurement techniques in a simple, fast manner and without mistakes due to the calibration of the measurement device.

Within this aim, an object of the present invention is to provide a measurement device that is highly reliable, relatively easy to provide and use, as well as economically competitive if compared to the background art.

This aim and these and other objects which will become better apparent hereinafter are achieved by a device for measuring the characteristic angles and dimensions of wheels, steering system and chassis of vehicles in general, comprising a plurality of three-dimensional optical readers, which are functionally connected to a computer and can be arranged peripherally to a vehicle whose dimensions and characteristic angles of wheels, steering system and chassis are to be measured, in such a manner that each one frames at least one wheel of said vehicle for the three-dimensional acquisition of an image of said at least one wheel, each one of said three-dimensional optical readers being provided with at least one fixed target for the setting and calibration of said measurement device, characterized in that at least one camera of each one of said three-dimensional optical readers is arranged in such a manner as to frame directly at least one fixed target of another one of said three-dimensional optical readers for the setting and calibration of said measurement device by three-dimensional acquisitions of said fixed targets performed by said at least one camera.

In addition, this aim and these and other objects which will become better apparent hereinafter are achieved by a method for measuring the characteristic angles and dimensions of wheels, steering system and chassis of vehicles in general, which can be obtained by using a measurement device, comprising the following steps:

a step of positioning said vehicle between said three-dimensional optical readers, a step of acquisition of images of said wheels, performed by means of said three-dimensional optical readers, a step of processing said acquired images to calculate the characteristic angles and dimensions of the wheels, steering system and chassis of said vehicle, performed by said computer, characterized in that it comprises a step of acquisition of images of said fixed targets, which is performed by means of said three-dimensional optical readers in order to identify the position and mutual orientation of said three-dimensional optical readers with respect to each other, the measurements performed in said step of acquisition of images of said fixed targets being used in said processing step to calculate the characteristic angles and dimensions of the wheels, steering system and chassis of said vehicle.

Further characteristics and advantages of the present invention will be apparent from the description of four preferred but not exclusive embodiments of a device for measuring the characteristic angles and dimensions of wheels, steering system and chassis of vehicles in general, and of a corresponding measurement method, illustrated by way of non-limiting example in the accompanying drawings, wherein.

Figure 1:
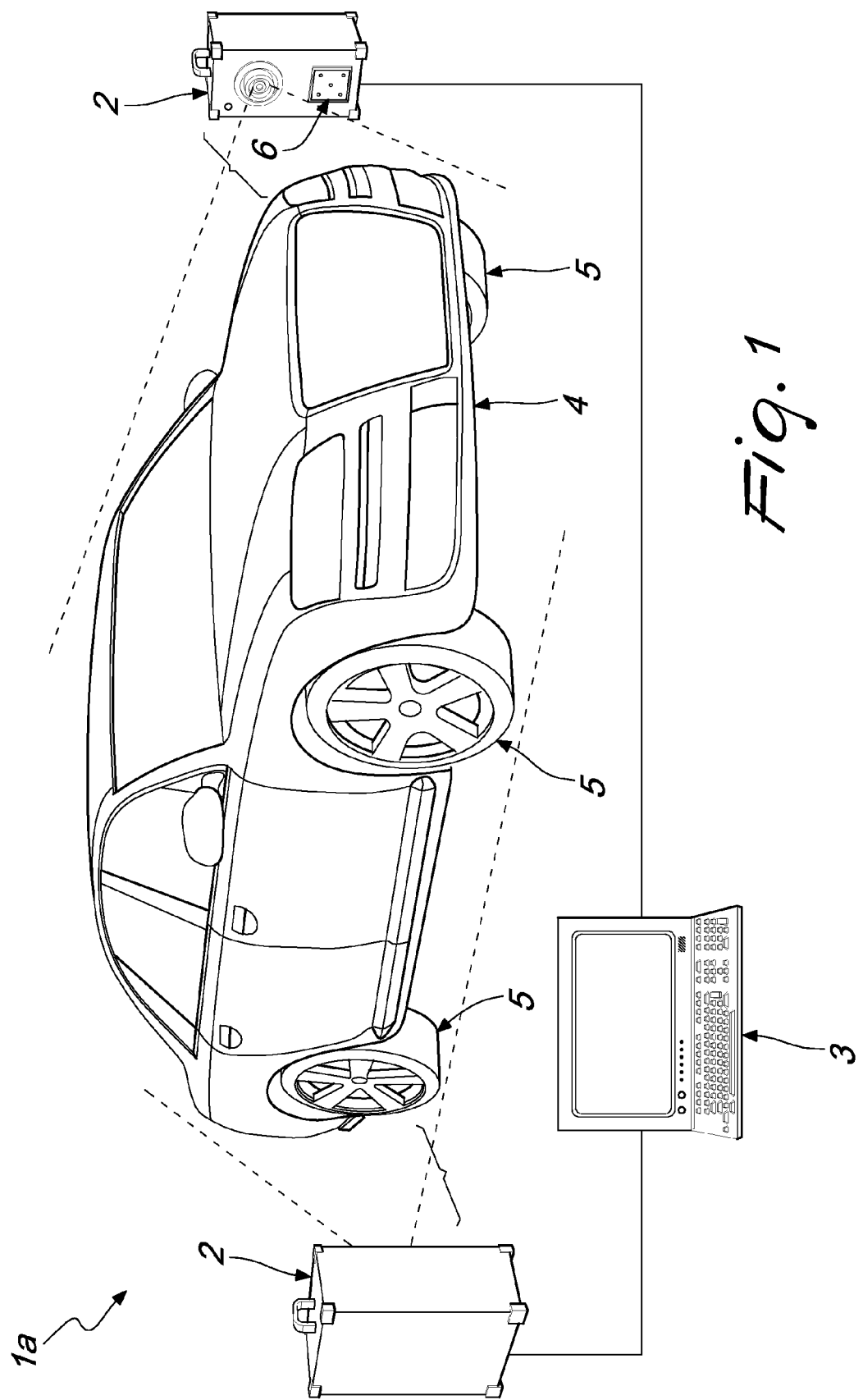
FIG. 1 is a perspective view of a first embodiment of a measurement device according to the invention during the step of three-dimensional acquisition of images of the wheels of a vehicle.

With reference to the figures, the device for measuring the characteristic angles and dimensions of wheels, steering system and chassis of vehicles in general, generally designated in the four proposed embodiments by the reference numerals 1a, 1b, 1c and 1d, comprises a plurality of three-dimensional optical readers 2 which are functionally connected to a computer 3 and can be arranged peripherally to a vehicle 4 whose characteristic angles and dimensions of wheels, steering system and chassis are to be measured in such a manner that each one frames at least one wheel 5 of the vehicle 4 for the three-dimensional acquisition of an image of said wheel 5.

According to the invention, at least one camera of each three-dimensional optical reader 2 is arranged in such a manner as to frame directly at least one fixed target 6 of another three-dimensional optical reader 2 for the setting and calibration of the measurement device 1a, 1b, 1c or 1d by means of three-dimensional acquisitions of the fixed targets 6 performed by the camera.

Advantageously, said camera has a clear field with a depth of more than at least 0.5 meters for a diameter of the tolerable circle of confusion of 2.2 micrometers and is arranged so as to clearly and directly frame at least one fixed target 6, with which the three-dimensional optical readers 2 are provided, of another three-dimensional optical reader 2 for the setting and calibration of the measurement devices 1a, 1b, 1c and 1d by means of three-dimensional acquisitions of the fixed targets 6 performed directly by the camera of the three-dimensional optical reader 2, preferably without the vehicle 4.

More precisely, the expression "fixed target 6" designates a target that is integral with the three-dimensional optical reader 2 on which it is mounted and in a known position in relation to the camera of the three-dimensional optical reader 2.

It must be stressed that the fixed targets 6 of these three-dimensional optical readers 2 can be of any shape as long as they have a known position with respect to the respective cameras of the three-dimensional optical readers 2 with which they are integral.

For example, as a particular case, the same structure that supports the cameras may be recognized as a fixed target.

Advantageously, the three-dimensional optical readers 2 have a wide viewing angle of at least 60° and preferably of at least 80°, so as to be able to acquire the fixed targets 6 of other three-dimensional optical readers 2 that are not arranged frontally.

The three-dimensional optical readers 2 consist of devices known in the art and commonly termed 3D scanners and can be of a different type.

Conveniently, in the proposed embodiments the three-dimensional optical readers 2 are of the stereo type, i.e., that comprise at least two cameras in a known relative position which acquire the same object, and comprise a projector which is adapted to project an image onto the object whose shape is to be acquired so as to increase the contrast of the images acquired by the two cameras, in order to facilitate the three-dimensional reconstruction of the acquired object.

In fact, by means of triangulation algorithms of a known type, it is possible to define the shape of the acquired object from the two acquired images.

As an alternative, other conventional three-dimensional optical readers 2 can be used such as, for example, stereo 3D scanners, structured-light 3D scanners with projector, structured-light 3D scanners with laser, with mono or stereo acquisition or other types of 3D scanner that are available on the market.

Figure 2:
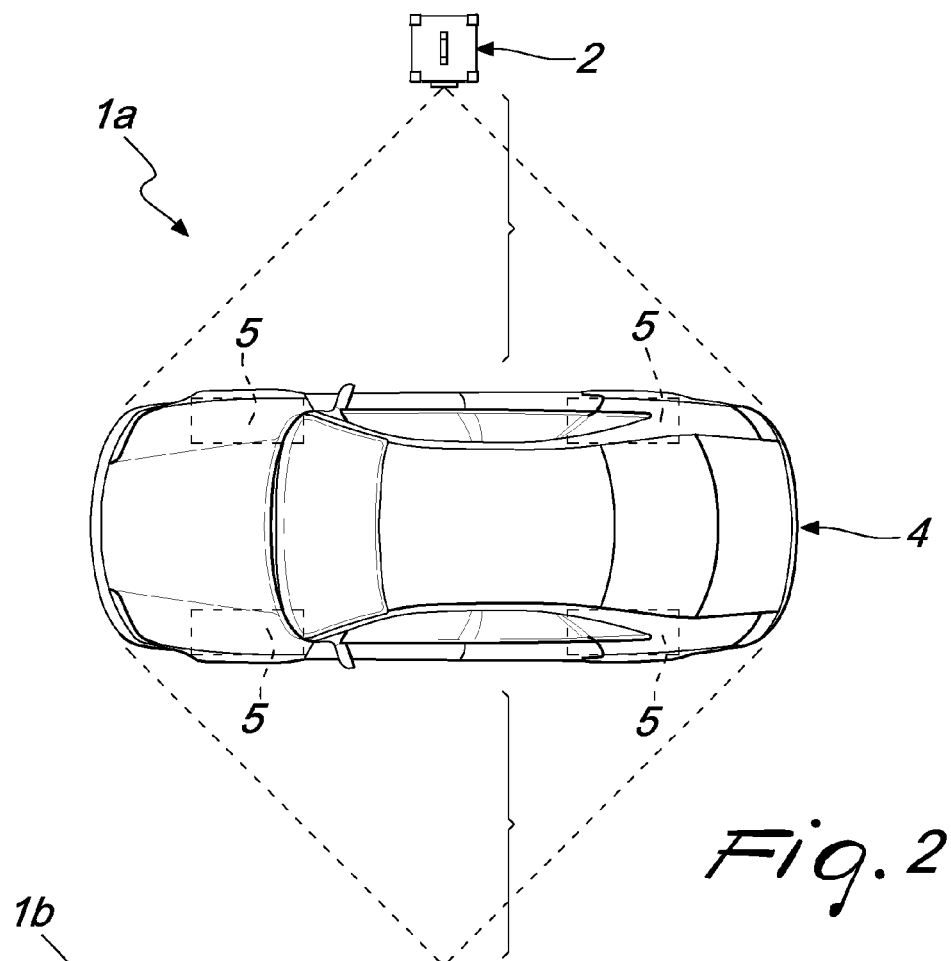
FIG. 2 is a schematic top plan view of the measurement device shown in FIG. 1.

With reference to FIGS. 1 and 2, in the first proposed embodiment the measurement device 1a comprises, for each side of the vehicle 4, which in this case is a car, a single three-dimensional optical reader 2 arranged so as to frame clearly all the wheels 5 of the vehicle 4 that belong to the same side.

Moreover, as will be described better hereinafter, at least one camera of each one of the two three-dimensional optical readers 2 is arranged in such a manner as to clearly frame, preferably in the absence of the vehicle 4, the fixed target 6 of the other three-dimensional optical reader 2 arranged on the opposite side with respect to the vehicle 4.

Figure 3:
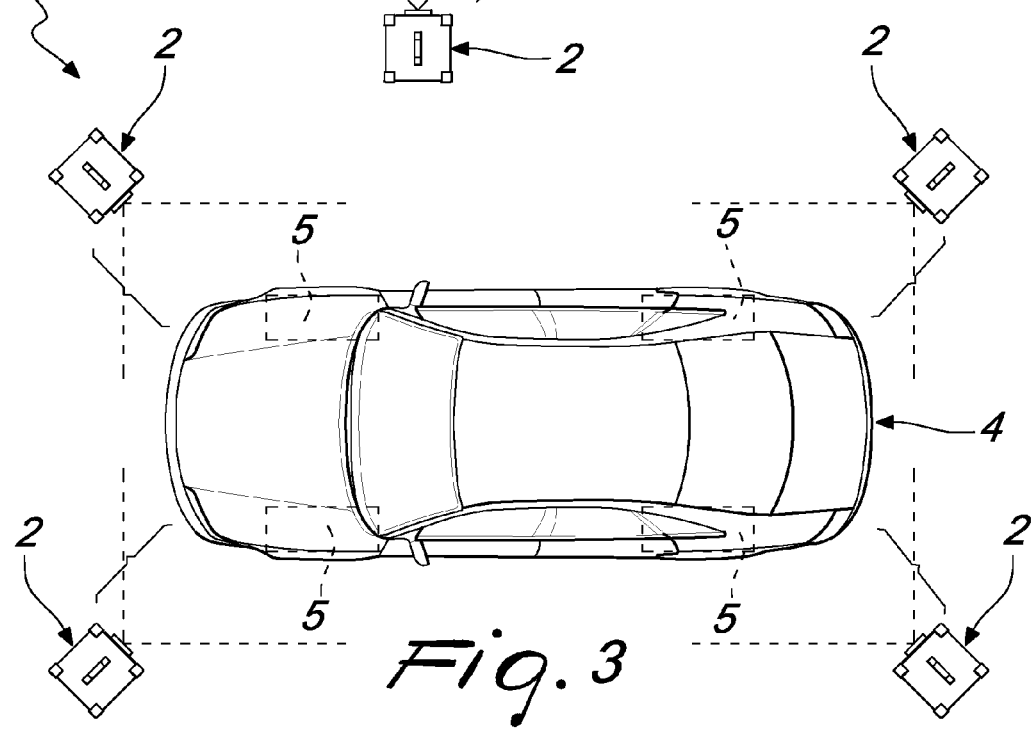
FIG. 3 is a schematic top plan view of a second embodiment of a measurement device according to the invention, during the step of three-dimensional acquisition of images of the wheels of a vehicle.

With reference to FIG. 3, in the second proposed embodiment the measurement device 1b comprises four three-dimensional optical readers 2, each arranged proximate to an angular portion of the vehicle 4, i.e., respectively one proximate to the right front corner, one proximate to the left front corner, one proximate to the right rear corner and one proximate to the left rear corner of the vehicle 4.

In this case also, at least one camera of each one of the three-dimensional optical readers 2 is arranged in such a manner as to frame clearly all the wheels 5 of the vehicle 4 that belong to the same side and frame clearly, preferably in the absence of the vehicle 4, the fixed targets 6 that belong to the other provided three-dimensional optical readers 2.

Figure 4:
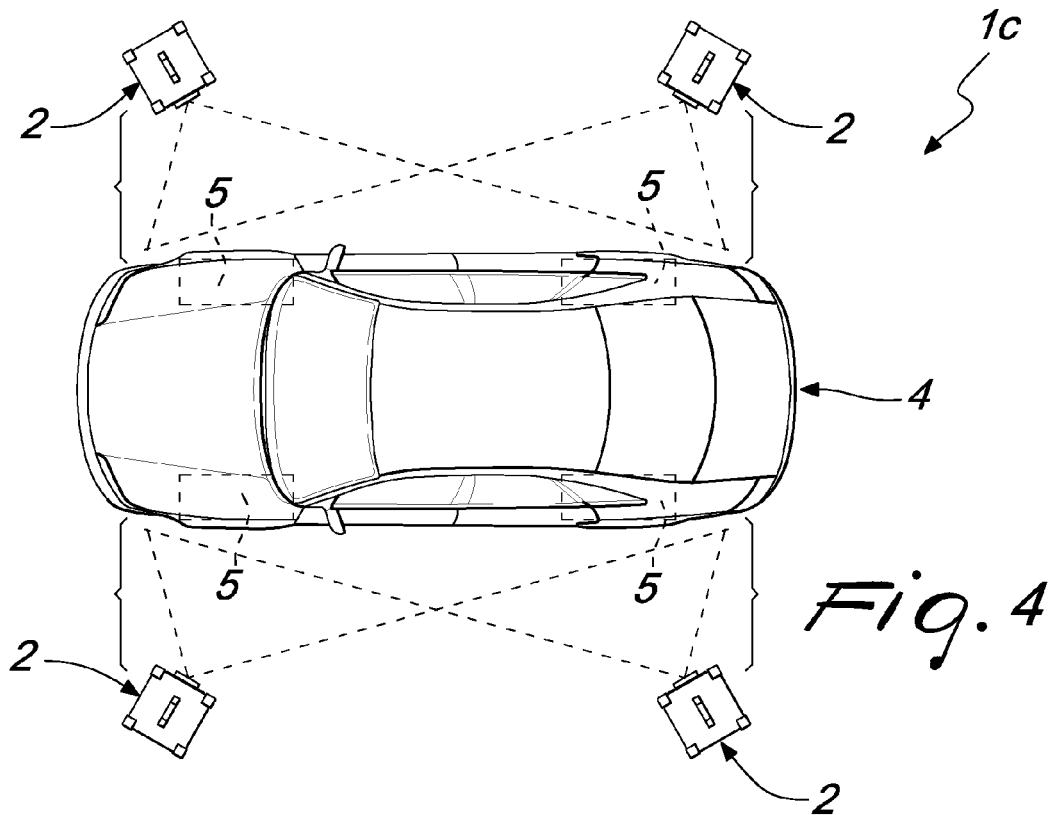
FIG. 4 is a schematic top plan view of a third embodiment of a measurement device according to the invention, during the step of three-dimensional acquisition of images of the wheels of a vehicle.

With reference to FIG. 4, in the third proposed embodiment the measurement device 1c comprises again four three-dimensional optical readers 2, each arranged proximate to an angular portion of the vehicle 4.

In this case also, at least one camera of each one of the three-dimensional optical readers 2 is arranged in such a manner as to clearly frame all the wheels 5 of the vehicle 4 that belong to the same side and to frame clearly, preferably in the absence of the vehicle 4, the fixed targets 6 that belong to the three-dimensional optical readers 2 arranged on the opposite side of the vehicle 4.

Figure 5:
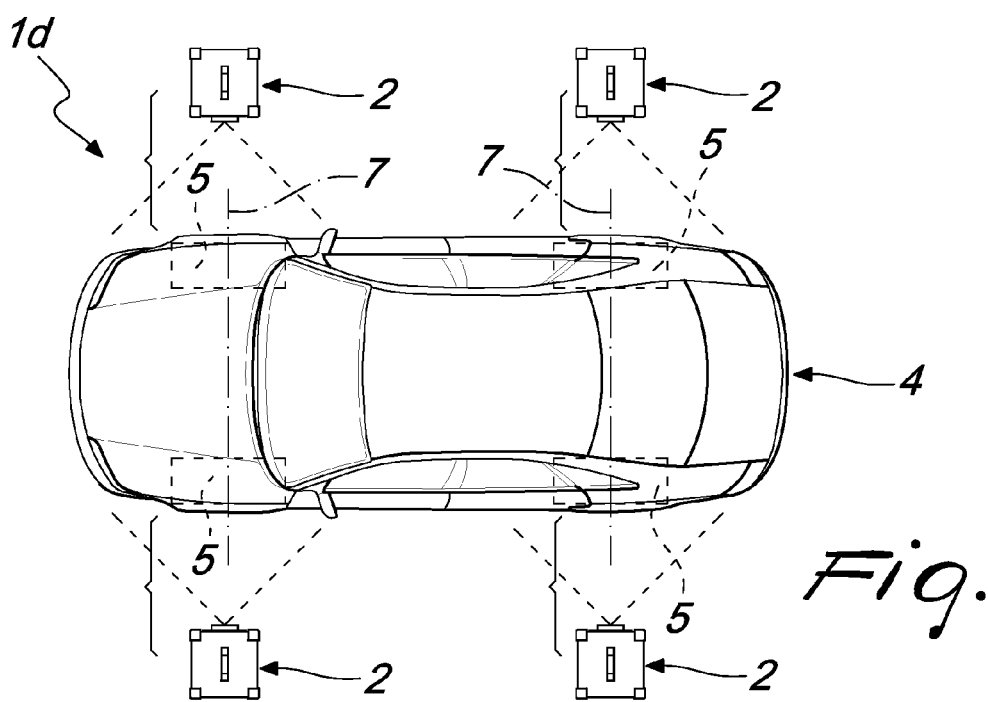
FIGS. 5 and 6 are two schematic top plan views of a fourth embodiment of a measurement device according to the invention, during the step of three-dimensional acquisition of images of the wheels of a vehicle.
Figure 6:
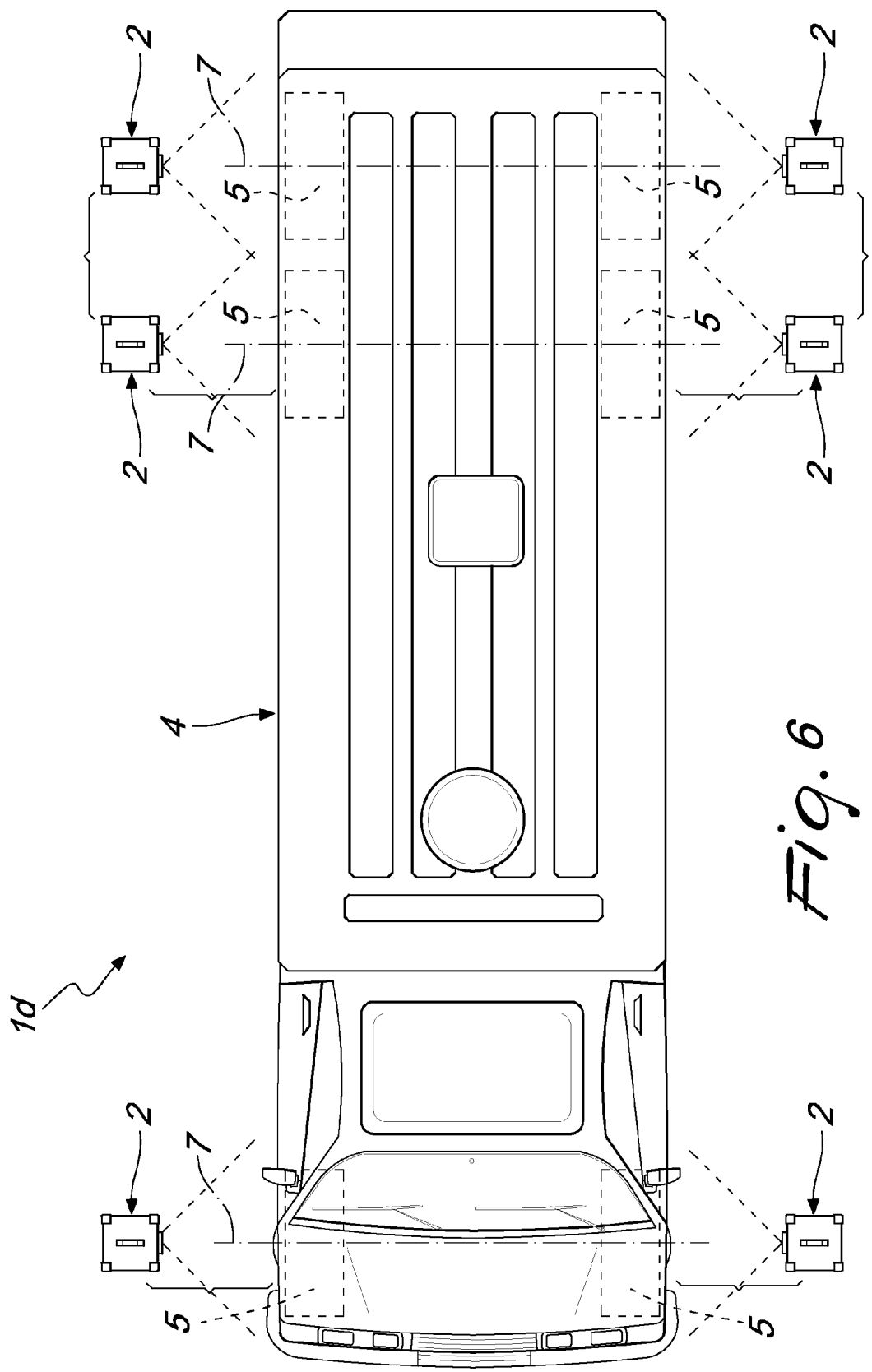
Figure 7:
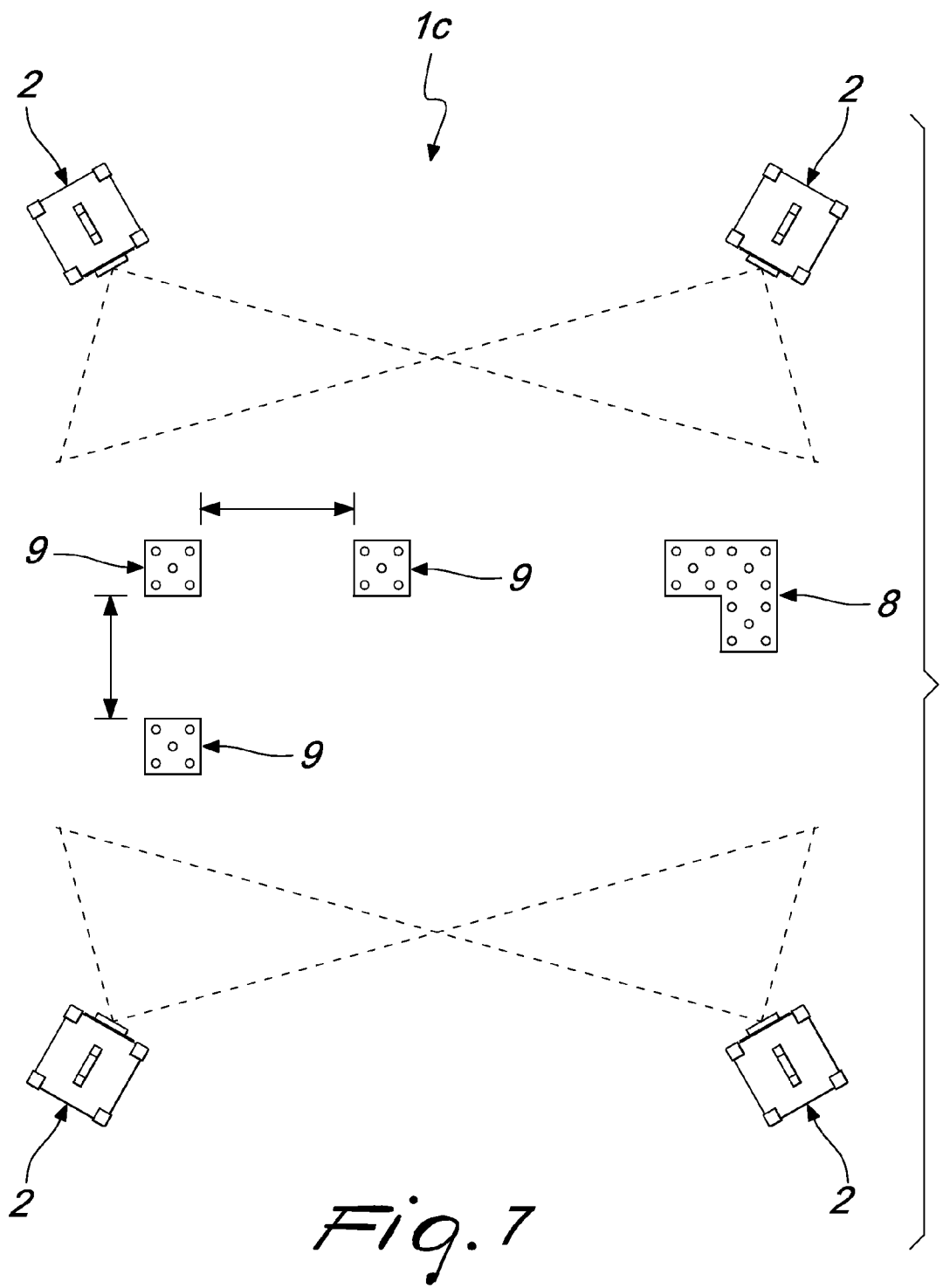
FIG. 7 is a schematic top plan view of a measurement device according to the invention during its setting and calibration operations.

With reference to FIGS. 5 and 6, in the fourth proposed embodiment the measurement device 1d comprises, for each axle 7 of the vehicle 4, a pair of three-dimensional optical readers 2 arranged mutually opposite with respect to the vehicle 4 substantially along the axle 7 in such a manner that each one frames clearly a wheel 5 that belongs to said axle 7 and in such a manner that each one frames clearly, preferably in the absence of the vehicle 4, one or more fixed targets 6 which belong to the three-dimensional optical readers 2 arranged on the opposite side of the vehicle 4 with respect to the three-dimensional optical reader 2 being considered, particularly at least the fixed target 6 that belongs to the three-dimensional optical reader 2 arranged along the same axle 7.

More precisely, in FIG. 5 cited above, the vehicle 4 is a car and therefore, since said car has only two axles 7, the measurement device 1d comprises only four three-dimensional optical readers 2. In FIG. 6, instead, the vehicle is a three-axle truck and therefore the measurement device 1d comprises six three-dimensional optical readers.

In order to improve the accuracy of the setting of the measurement devices 1a, 1b, 1c and 1d, during their installation it is possible to fix the three-dimensional optical readers 2 to elements that ensure the stability, albeit in an approximate manner, of the relative orientation and position of said three-dimensional optical readers 2 such as, for example, to the ground.

In addition, it is possible to perform preliminary measurements that allow to determine the positions and orientations of the three-dimensional optical readers 2 with respect to each other, also involving instruments that are different from said three-dimensional optical readers 2 and from the fixed targets 6, to be then combined with the three-dimensional acquisitions of the fixed targets 6, improving considerably the accuracy of the setting.

Advantageously, these preliminary measurements can consist of three-dimensional acquisitions of a movable target 8 or 9, which can be arranged between the three-dimensional optical readers 2 in different positions, for each one of which said target is framed clearly by at least one camera of at least two three-dimensional optical readers 2.

In the particular case in which the geometry of the movable target 8 or 9 is known and the latter is framed simultaneously by all the three-dimensional optical readers 2, a single position is sufficient.

In addition, it is possible to perform measurements with linear measuring tools of the distances between characteristic points that belong to the three-dimensional optical readers 2 with these points arranged in a known position with respect to the cameras.

Figure 8:
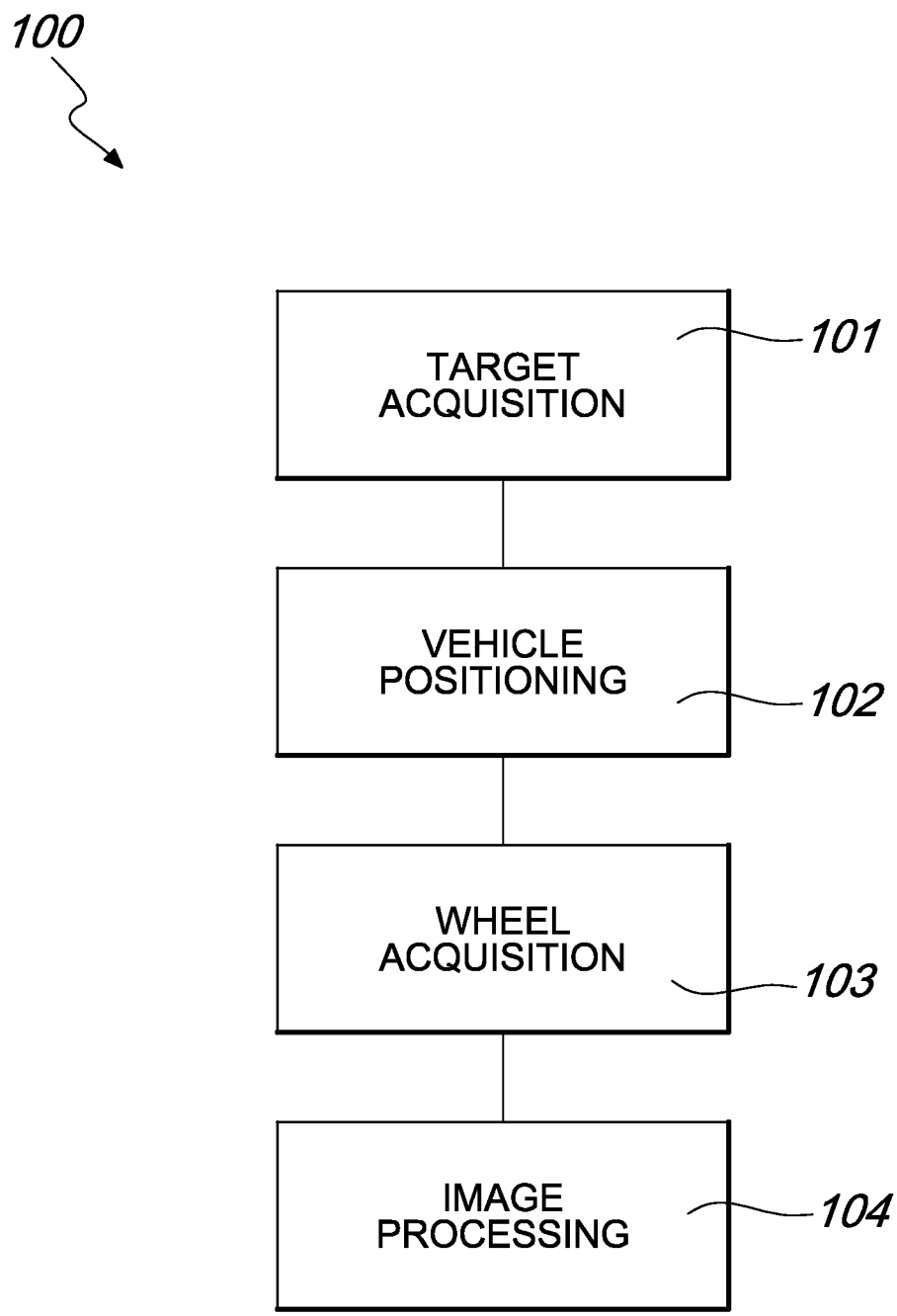
FIG. 8 is a block diagram view of the measurement method with which the measurement device according to the invention operates.

With reference to the diagram shown in FIG. 8, the method for measuring the characteristic angles and dimensions of wheels, steering system and chassis of vehicles in general, generally designated in the cited figure by the reference numeral 100 and obtainable by using a measurement device 1a, 1b, 1c or 1d just described, comprises, according to the invention, a first step 101 of acquisition of images of the fixed targets 6 performed by means of three-dimensional optical readers 2, preferably in the absence of the vehicle 4, in order to identify the position and mutual orientation of the three-dimensional optical readers 2 with respect to each other.

One then proceeds with a step 102 of positioning the vehicle 4 between the three-dimensional optical readers 2 so that its wheels 5 are perfectly framed by the three-dimensional optical readers 2 according to the arrangements described previously.

Having done this, one proceeds with a step 103 of acquisition of images of the wheels 5, performed by means of the three-dimensional optical readers 2.

Finally, by means of the computer 3, one proceeds with a step 104 of processing the three-dimensional acquisitions of the wheels 5 and of the fixed targets 6, in order to calculate the characteristic angles and dimensions of the wheels, steering system and chassis of the vehicle 4.

As already mentioned, in order to improve the accuracy of the setting, preliminary measurements that allow an approximate estimate of the position and orientation of the three-dimensional optical readers 2, described previously, may be advantageously performed only once, before the step 101 of three-dimensional acquisition of the targets 6, 8 or 9.

More precisely, in the step 101 of acquisition of images of the fixed targets 6 the distances between characteristic points of the fixed targets 6 are measured with a linear measuring tool.

These measured distances are then used in the processing step 104 to calculate the characteristic angles and dimensions of the wheels, steering system and chassis of the vehicle 4.

In practice it has been found that the device for measuring the characteristic angles and dimensions of wheels, steering system and chassis of vehicles in general, and the corresponding measurement method, according to the present invention, fully achieve the intended aim and objects, since they allow accurate measurement of the characteristic values of the vehicle by means of contactless shape measurement techniques in a simple, fast manner and without mistakes due to the calibration of the measurement device, without using additional optical readers added to the three-dimensional optical readers for setting and calibration of the measurement device.

In this manner the measurement device according to the invention, as well as the corresponding measurement method, are less complex than the background art, easier to calibrate, as well as competitive economically if compared with the background art.

Another advantage of the measurement device according to the invention resides in that it is possible to arrange the individual three-dimensional optical readers independently of the wheel base of the vehicle, since by using lenses with wide viewing angles, the wheels are still framed even if they are not aligned with said readers.

The device for measuring the characteristic angles and dimensions of wheels, steering system and chassis of vehicles in general, and the corresponding measurement method, thus conceived are susceptible of numerous modifications and variations, all of which are within the scope of the appended claims; all the details may further be replaced with other technically equivalent elements.

In practice, the materials used, so long as they are compatible with the specific use, as well as the contingent dimensions and shapes, may be any according to requirements and to the state of the art.

The disclosures in Italian Patent Application No. MI2011A001695 from which this application claims priority are incorporated herein by reference.

The invention claimed is:

1. A device for measuring characteristic angles and dimensions of wheels, steering system and chassis of vehicles in general, comprising a pair of three-dimensional optical readers for each axle of the vehicle, the three-dimensional optional readers being functionally connected to a computer and arranged peripherally to a vehicle mutually opposite with respect to each axle of the vehicle whose dimensions and characteristic angles of wheels, steering system and chassis are to be measured, each optical reader comprising at least one camera, such that each camera is in each optical reader framing at least one wheel of said vehicle for the three-dimensional acquisition of an image of said at least one wheel, each one of said three-dimensional optical readers being further provided with at least one fixed target for the setting and calibration of said measurement device, wherein at least one camera of each one of said three-dimensional optical readers is arranged in such a manner as to frame directly at least one fixed target of another one of said three-dimensional optical readers, and wherein there is one camera of at least one of said three-dimensional optical readers arranged in such a manner as to frame directly at least two fixed targets of another two of said three-dimensional optical readers arranged on the opposite side of the vehicle, one along the same axle of the vehicle and the other along a different axle of the vehicle, with respect to the three-dimensional optical reader being considered, for the setting and calibration of said measurement device by three-dimensional acquisitions of said fixed targets performed by said at least one camera.

2. The measurement device according to claim 1, wherein said at least one camera of each one of said three-dimensional optical readers has a clear field that has a depth of more than at least 0.5 meters for a diameter of the tolerable circle of confusion of 2.2 micrometers and is arranged so as to clearly frame said fixed targets.

3. The measurement device according to claim 2, wherein said clear field has a depth of more than 1 meter.

4. The measurement device according to claim 1, wherein said at least one camera of each one of said three-dimensional optical readers has a viewing angle of at least 60°.

5. The measurement device according to claim 4, wherein said viewing angle is at least 80°.

6. The measurement device according to claim 1, wherein said three-dimensional optical readers are of the stereo type and comprise a projector that is adapted to project an image onto an object whose shape is to be acquired so as to increase the contrast of the images acquired by the two cameras.

7. The measurement device according to claim 1, further comprising, for each side of said vehicle, a single one of said three-dimensional optical readers which is arranged in such a manner as to frame clearly all the wheels of said vehicle that belong to the same side of said vehicle and in such a manner as to frame clearly the fixed target of the other three-dimensional optical reader arranged on the opposite side with respect to said vehicle.

8. The measurement device according to claim 1, further comprising four of said three-dimensional optical readers, each arranged proximate to an angular portion of said vehicle in such a manner that each one of said three-dimensional optical readers frames clearly all the wheels of said vehicle that belong to the same side and frames clearly the fixed targets that belong to the other ones of said three-dimensional optical readers.

9. The measurement device according to claim 1, further comprising four of said three-dimensional optical readers, each arranged proximate to an angular portion of said vehicle in such a manner that each one of said three-dimensional optical readers frames clearly all the wheels of said vehicle that belong to the same side and frames clearly the fixed targets that belong to the three-dimensional optical readers that belong to the opposite side.

10. The measurement device according to claim 1, further comprising, for each axle of said vehicle, a pair of said three-dimensional optical readers arranged mutually opposite with respect to said vehicle substantially along said axle in such a manner that each one frames clearly the wheel that belongs to said axle and in such a manner that each one frames clearly at least the fixed target that belongs to the three-dimensional optical reader arranged on the opposite side of said vehicle with respect to the three-dimensional optical reader being considered, along the same axle as the framed wheel.

11. The measurement device according to claim 10, wherein each one of said three-dimensional optical readers frames each one of the fixed targets that belong to the three-dimensional optical readers arranged on the opposite side of said vehicle with respect to the three-dimensional optical reader being considered.

12. The measurement device according to claim 1, further comprising at least one movable target arranged between said three-dimensional optical readers in different positions, for each of which said movable target is framed clearly by at least one camera of at least two of said three-dimensional optical readers.

13. A method for measuring characteristic angles and dimensions of wheels, steering system and chassis of vehicles in general, the method being carried out by using a measurement device according to claim 1, comprising the following steps:

positioning said vehicle between said three-dimensional optical readers,
  acquiring images of said wheels, performed by said three-dimensional optical readers,
  processing said acquired images to calculate characteristic angles and dimensions of the wheels, steering system and chassis of said vehicle performed by said computer,
  further comprising a step of acquiring images of said fixed targets that is performed by said three-dimensional optical readers in order to identify the position and mutual orientation of said three-dimensional optical readers with respect to each other, the measurements performed in said step of acquisition of images of said fixed targets being used in said processing step to calculate the characteristic angles and dimensions of the wheels, steering system and chassis of said vehicle.

14. The method according to claim 13, wherein in said step of acquiring images of said fixed targets, at least one movable target arranged between said three-dimensional optical readers in different positions is also acquired in order to determine the position and mutual orientation of said three-dimensional optical readers with respect to each other.

15. The method according to claim 13, wherein in said step of acquiring images of said fixed targets the distances between characteristic points of said fixed targets are measured with a linear measuring tool, said measured distances being used in said processing step to calculate the characteristic angles and dimensions of the wheels, steering system and chassis of said vehicle.

* * * * *